United States Patent [19]

Jasmin

[11] Patent Number: 4,490,808

[45] Date of Patent: Dec. 25, 1984

[54] ELECTRONIC SIMULATOR FOR THE SIMULATION OF A HYDRO-TURBINE

[75] Inventor: Gilles Jasmin, Sherbrooke, Canada

[73] Assignee: Hydro Quebec, Montreal, Canada

[21] Appl. No.: 363,766

[22] Filed: Mar. 31, 1982

[30] Foreign Application Priority Data

Apr. 2, 1981 [CA] Canada .................................. 374501

[51] Int. Cl.[3] .................................................. G06F 7/62

[52] U.S. Cl. .................................... 364/802; 364/495; 364/553; 364/803

[58] Field of Search ............... 364/802, 553, 803, 494, 364/495

[56] References Cited

U.S. PATENT DOCUMENTS 3,505,512 4/1970 Fricke et al. ......................... 364/801
3,529,144 9/1970 Patterson et al. ................... 364/803
3,911,286 10/1975 Uram .................................. 364/495

*Primary Examiner*—Jerry Smith
*Assistant Examiner*—Allen MacDonald
*Attorney, Agent, or Firm*—Schwartz, Jeffery, Schwaab, Mack, Blumenthal & Koch

[57] ABSTRACT

Disclosed is an electronic, analog, real time simulator for simulation of hydro turbines. This simulator comprises circuits for introducing working conditions of the turbine, such as, for example, the position of the gate controlling the quantity of water flowing through the turbine and the water head. The working conditions are converted by a plurality of multiplication circuits into standardized signals that are supplied to simulating circuits in which the standardized signal are converted into transfer functions. Each of these simulating circuits receives at least one of the standardized signals as an input signal and generates an output signal representing intermediary results, such as the water flow or the generated power. The so obtained intermediary results are then supplied to other multiplication circuits in which they are converted into useful signals representative of the working conditions of the turbine. This simulator may also comprise additional circuits for simultaneously simulating a penstock and thus varying the water head conditions of the turbine and/or simulating a speed regulator acting on the gate position as a function of the angular speed of the turbine and the power generated.

38 Claims, 20 Drawing Figures

ELECTRONIC SIMULATOR FOR THE SIMULATION OF A HYDRO-TURBINE

BACKGROUND OF THE INVENTION

1. Field of the Invention

The present invention relates to an electronic simulator for hydraulic turbines. More particularly, the present invention relates to an electronic simulator for simulating the working characteristics and/or parameters of turbines, whether or not provided with a speed regulator and/or a penstock.

2. Background of the Invention

A simulator is an apparatus whose main function is to determine how a given apparatus will react in real time, without having to construct the actual device. Another function of a simulator is to analyze, in an inexpensive manner, a given apparatus. In the present case, a turbine which may be provided with a speed regulator and/or a penstock is the focus of the simulator.

Theoretically, it is possible to provide a specific simulator for every turbine desired to be simulated, or for each new turbine. In that case, the particular parameters of each turbine can be permanently programmed into the simulator as they will remain constant. It is also possible to provide a specific simulator for the penstock and speed regulator of each turbine.

However, it becomes economically disadvantageous to provide a simulator for each turbine or associated component thereof which it is desired to simulate.

A need exists for an universal simulator which will permit an investigator to determine the operational characteristics of various types of turbines with a single apparatus. The design of such an universal simulator should be optimized inasmuch as it will be used for simulating various installations employing various types of turbines and because high accuracy is required.

In order to provide accurate and useful results, a simulator should also take into account the fact that the relations between the various characteristics of a turbine are not linear.

In most prior art simulators, turbines, speed regulators and penstocks are treated as being linearized around their operating point. These simulators do not take into account the nonlinearities in the operation of a turbine. Such simulations thus generate results of limited accuracy and usefulness.

Alternatively, if one tries to develop a mathematical model of the water flow inside a turbine and takes into account all the factors that scientific thought can muster, the results are so complex that they are unusable. In fact, the hydrodynamic equations at which one can experimentally arrive can only be solved when studying a turbine around its operating point. These equations cannot be solved when the turbine is operating far off its operating point and it is therefore necessary to proceed either to experimental observation in order to determine the inner working of the water turbine or to study a scaled down unit while incorporating in the study certain empirical corrections to validate the results for the real turbine. In this regard, it may be noted that a static model developed for a turbine, when not taking into account the hydraulic ducts effect, can also be validly used as a dynamic model, because the dynamic working of a turbine is very close to the static working of the same turbine.

SUMMARY OF THE INVENTION

It is therefore an object of the present invention to provide an universal simulator that allows simulation of a wide range of turbines and regulators by mere adjustment of the particular parameters related to the operational characteristics of each turbine.

Another object of the present invention is to provide a simulator capable of simulating various types of hydraulic turbines, for example, of the Pelton, Kaplan, Francis or Propeller type, while taking into account the non-linear relationships existing in their mathematical models between the parameters such as the power, water flow, speed, water head and gate position, so that the simulation will be accurate and useful.

It is a further object of the present invention to provide a simulator which will be accurate even under very small or very large perturbations such as, for example, load shedding.

A still further object of the present invention is to provide a simulator in which various types of speed regulators can be simulated at the same time as the turbine and in a sufficiently flexible way to result in an accurate and useful simulation.

A still further object of this invention is to provide a simulator which takes into account not only the nonlinearity of the generated power due to the net head and the gate position, but also the effect of the speed on the generated power and the water flow.

Another object of the present invention is to provide a method of simulating that represents the operation of the turbine with substantial accuracy for any gate position and at any speed ranging from half nominal speed to load shedding speed.

Another object of the invention is to provide a simulator, which simulates the operation of a hydraulic turbine in a realistic way.

To achieve the foregoing and other objects and in accordance with the purpose of the present invention, as embodied and broadly described herein, the simulator of this invention may comprise means for introducing various working conditions of the turbine into the simulation. Conditions such as those representing the position of the gate controlling the water flow in the simulated turbine, and the water head of the simulated turbine as well as a simulator device for converting the various working conditions into standardized signals may be used. The simulator may further comprise a device for transforming the standardized signals into transfer functions that take into account the non-linear operation of the turbine. This device may preferably include several functionsimulating circuits, each of which receives only one of the standardized signals as input and generates an output signal representative of an intermediary result. Each of the transfer functions should preferably represent an equation which in turn is representative of the operation of the turbine with respect to the specific condition given as the input signal, the other conditions remaining constant. Preferably, the simulator will further comprise a device for converting at least part of the intermediary results into representative signals of the turbine operation.

In accordance with a preferred embodiment of the invention, there is provided a first analog device which generates a standardized signal representative of the angular speed of the turbine. The signal is generated by dividing the angular speed by a coefficient $\sqrt{\bar{h}}$ ($\bar{h}$ being representative of the water net head). A second analog device may be provided, having a first circuit therein for simulating the generated power as a function of the standardized speed, this function may preferably be represented by a parabola and realizable by using substractors and multipliers. This second analog device may also have a second circuit for simulating the generated power as a function of the gate position, as well as a third circuit for simulating the water flow as a function of the angular speed of the turbine, the latter function being representable by a straight line and realizable with an adder and an amplifier. The second analog device may preferably include a circuit for simulating the water flow as a function of the gate position, this function being representable by a straight line and realizable by an amplifier (or even by a wire provided that the other parameters are selected properly).

A third analog device may preferably be utilized which multiplies corresponding pairs of intermediary signals given by the second device to yield values representative of the water flow and power generated. This third device may also standardize these values by multiplying them by an appropriate factor.

In accordance with another embodiment of the invention, the simulator may comprise additional devices for simulating the penstock, according to the following equation:

$$\bar{h} = 1 + \phi_o^*(1 - \bar{q}^2) - Tl^* \frac{d\bar{q}}{dt} \quad (1)$$

wherein $\bar{h}$ represents the net head (this signal being also used as an input to the first means of the simulator), $\phi_o^*$ represents the energy losses in the penstock, $Tl^*$ represents the penstock water starting time and $\bar{q}$ represents the water flow.

In accordance with a further embodiment of the invention, the simulator may also comprise further devices for simulating a speed regulator, these further devices may include filters, adder and substractor circuits, integrators, etc. By realizing such a particular circuit and/or introducing all the appropriate switches, these devices permit the simulation of, for example, a regulator having a proporational and integrating action with indirect tachometric adjustment by temporary feedback or composite accelerotachometric adjustment. These further devices also permit the simulation of a regulator having a proportional, integrative and derivative action with composite accelerotachometric adjustment by transitory feedback.

Generally, when performing the simulation, only the penstock will be considered. Indeed, for long period phenomenon (those exceeding about one minute) that are generated by the other hydraulic ducts of the installation, such as the inlet duct, the well and the equilibrium room, will not be considered and will not be simulated.

Reference will now be made to the following publications, incorporated herein by reference, which provide background for some of the equations developed in the present disclosure.

Lucien Vivier, "Turbines hydrauliques et leur regulation", Editions Albin Michel, Paris, 1966;

Streeter, Fluid Mechanics, McGraw-Hill, New York, 4th edition, 1966;

Fernando Fonseca, "Etude de la stabilite de chambres d'equilibre appartenant a des centrales couplees en parallele", These de maitrise, department de Genie Civil, Ecole Polytechnique de Montreal, 1972;

Ateliers de Construction Mecanique de Vevey, "La regulation des turbines hydrauliques", (Bulletin), 1968, S.A. 1800 Vevey, Suisse;

Neyrpic (Division de la Societe Alsthom), *Rapid Governor,* (Bulletin), notice #1087, Neyrpic 38—Grenoble, France;

Woodward Governor Company., *Woodward Transistorized Electric-Hydraulic Governor, (Bulletin), Rockford, Ill., U.S.A.*

Reference is also hereby made to Canadian Pat. No. 1,083,259 issued on Aug. 5, 1980, to the same assignee, which is incorporated herein by reference and which discloses a system for simulating characteristics of an electromagnetic device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

Figure 1:
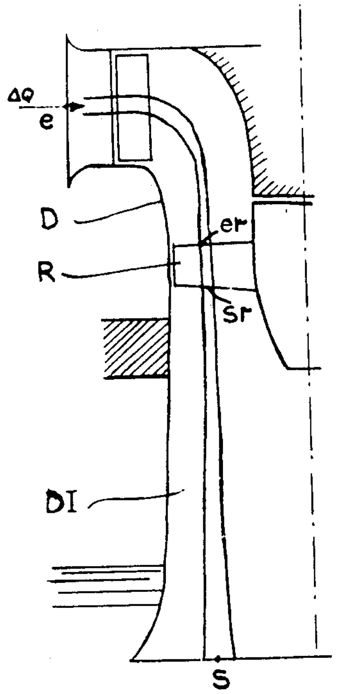
FIG. 1 schematically illustrates a flow of water through the various components of a turbine.

Turning first to FIG. 1, there is schematically depicted the flow of water through the various components of a turbine.

The general law that applies to such a non-compressible fluid flow, can be applied to the water flowing through the turbine. In a differential form, this law reads as follows:

$$\frac{c\,dc}{g} + \frac{dp}{\gamma} + dz + d\phi = dT$$

when the energy is expressed per weight unit, as is usually done when liquids are concerned. In this expression, c is the absolute speed of the water, p the pressure, $\gamma$ the specific weight of the fluid, g the gravitational acceleration, z the height of the water flow, $\phi$ the energy losses and T the work that can be retrieved from the outside.

From the turbine input e to the input er of the wheel R, that is through the distributor D, the above equation can be integrated as follows (see FIG. 1):

$$\frac{c_e^2 - c_{er}^2}{2g} + \frac{P_e - P_{er}}{\gamma} + z_e - z_{er} - \phi_{e\,er} = O \quad (3)$$

From the input er to the output sr of the wheel R, that is through the wheel R, the same equation can be integrated as follows:

$$\frac{c_{er}^2 - c_{sr}^2}{2g} + \frac{P_{er} - P_{sr}}{\gamma} + z_{er} - z_{sr} - \phi_{ersr} = T \quad (4)$$

Last of all, from the output sr of the wheel R to the turbine output s, which means through the diffuser DI, the same equation can be integrated as follows:

$$\frac{c_{sr}^2 - c_s^2}{2g} + \frac{P_{sr} - P_s}{\gamma} + z_{sr} - z_s - \phi_{srs} = O \quad (5)$$

By adding equations (3), (4), and (5), we get:

$$\frac{c_e^2 - c_s^2}{2g} + \frac{P_e - P_s}{\gamma} + z_e - z_s = \phi_{es} + T \quad (6)$$

The left side of this equation represents the difference between the energy contained in one weight per unit of water at the turbine input and output respectively, that is the energy that is given to the turbine. The terms of this equation are proportional to a length, and the quantity defined by this equation is called "water head" or "net head" and can be expressed as follows:

$$H = He - Hs = \frac{c_e^2 - c_s^2}{2g} + \frac{P_e - P_s}{\gamma} + z_e - z_s \quad (7)$$

The right side of the equation (6) represents the energy losses by the fluid flowing in the turbine by frictions against the walls guiding the water flow, by internal frictions (viscosity, slips streams and swirl) and by impact against the paddles of the turbine.

Last of all, the expression T (equation (6)) represents the work transmitted to the mobile parts of the wheels, which work results from the action of the fluid against the paddles. This quantity, which is also proportional to a length, is called "effective head". It represents the energy that actually would be transmitted to the turbine shaft if some other losses not directly related to the fluid flow per se, did not exist. These other losses are due to the friction of the bearings of the axle and of their adjusting devices, to the function of the wheel web against the surrounding water, to the internal leakage and to the residual speed. In the case of the Pelton turbines, for example, other losses result from the aeration of the paddles when rotating in the air from their slipping and bumping.

For testing purposes, a scaled down model is usually used with a constant net head. Predetermined positions of the device are used for regulating the water flow. These positions can be defined by the value of a parameter x representative of the gate position where $x=1$ represents a maximal opening. The gate turbine speed N (angular velocity) may be varied from zero to the load shedding speed, by an opposing torque C resulting from a braking mechanism which may vary from a blocking position (jamming torque) to a completely slack position (zero torque). For each value of the torque C, the turbine speed N and the turbine water flow Q are determined. Then the following relations are calculated:

Total water power:

$$P_a = \gamma QH \quad (8)$$

where $\gamma$ represents mass density of water; generated turbine power:

$$P_r = (\pi/30CN \quad (9)$$

turbine efficiency:

$$\eta = (P_r/P_a) \quad (10)$$

In order to compare turbines of different types it is necessary to convert all the measured data to a unit net head and a unit turbine diameter base or in other words, to standardize or normalize the measured data. For this purpose, the following similarity relations can be used:

Turbine speed per unit turbine diameter and unit net head:

$$N_{11} = \frac{N \cdot D}{\sqrt{H}} \quad (11)$$

Turbine water flow per unit turbine diameter and unit net head:

$$Q_{11} = \frac{Q}{D^2\sqrt{H}} \quad (12)$$

Turbine Torque per unit turbine diameter and unit net head:

$$C_{11}=(C/D^3H) \quad (13)$$

Generated turbine power per unit turbine diameter and unit net head:

$$p_{11} = \frac{P}{D^2H\sqrt{H}} \quad (14)$$

Where D represents the wheel diameter of the turbines and P the power generated by the turbine.

If it is not possible to keep a constant water head during the tests, the above standardization should introduce the necessary corrections.

The "specific" speed of the hydraulic turbine is a parameter used for classifying the various types of turbines. As the characteristics of all the turbines of a family of turbines geometrically similar can be inferred from any given turbine of the family, the hydraulicians define and classify the various families of turbines by fixing the values of two characteristics selected amongst three basic characteristics [(H, Q, N) or (H, P, N)] of a reference turbine, and by using the third characteristic as a criterium of definition and classification. The oldest and most appropriate mode of carrying out such a classification has been up to now to fix the values of the power and water head of the turbine, to 1 HP (horse power) and 1 meter respectively, and then to use the specific speed of the turbine as classification criterium. The specific speed is defined as follows (by using similarity relations):

$$n_s=NP^{\frac{1}{2}}H^{-5/4} \quad (15)$$

wherein $n_s$ is the specific speed of the turbine in revolution per minute, N is the actual speed of the turbine, P its generated power in HP, H its net head in meter.

When using the above criterium, the major families of turbines can be classified as follows:

Pelton: $3<n_s<36$ R.P.M.
Francis: $60<n_s<400$ R.P.M.
Propeller
(Kaplan): $300<n_s<1200$ R.P.M.

These values apply to an "elementary" turbine, that is a turbine consisting of a wheel and a distributor. Thus, the empty space between 36–60 R.P.M. in the above range can be "filled up" by using a multiple Pelton turbine. Not only the type but also the structures of the turbines vary with the specific speed.

The theonical characteristics of the turbines with constant head and gate position will now be explained.

Figure 2:
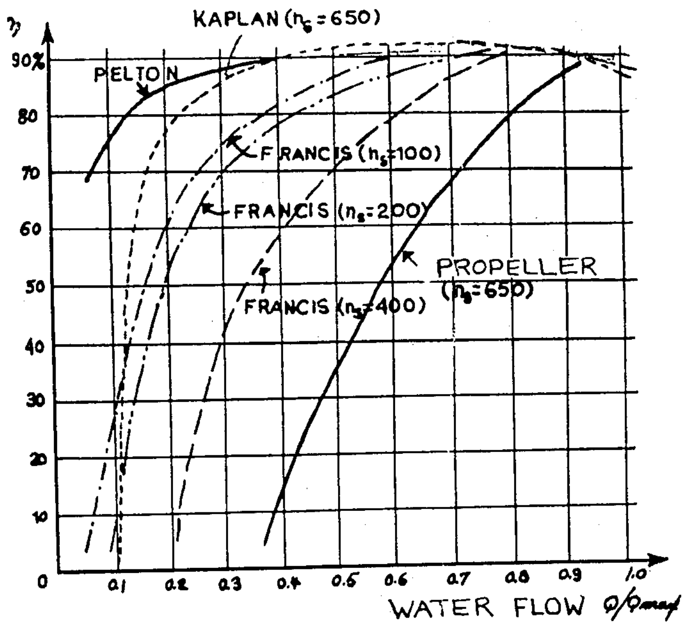
FIG. 2 depicts various curves representing the efficiency of different types of turbines versus the per unit flow.

The maximum global efficiency, at a specified rotation speed, is calculated at the most frequent water flow and the most frequent water head. Curves giving the efficiency of different types of turbine, versus the relative water flow $Q/Q_{max}$ are shown in FIG. 2. For each curve $n_s$ represents the specific speed of a given turbine.

The efficiency curve of the Pelton turbine is flat, because the variation of its water flow has only a small influence on its efficiency. The efficiency curve of a Kaplan turbine is also flat as the bearing of the blades permits the matching of the passage sections of the wheel with reduced water flow. On the other hand, the Francis and Propeller turbines have constant passing section which results in relatively high efficiencies only at higher water flows.

Figures 3A, 3B, 3C:
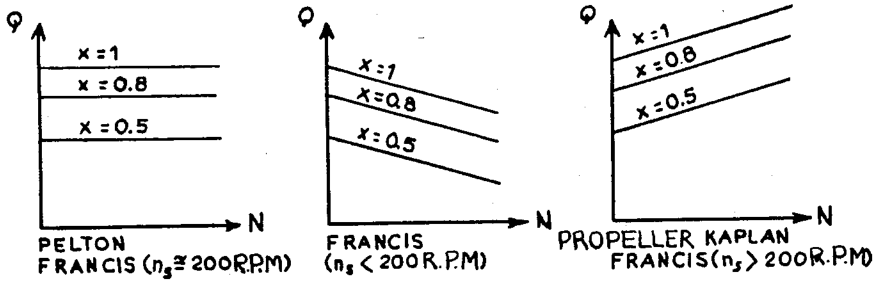
FIGS. 3A–C respectively depict curves representing the turbine water flow versus the angular speed for various types of turbines at nominal net head.
Figure 4:
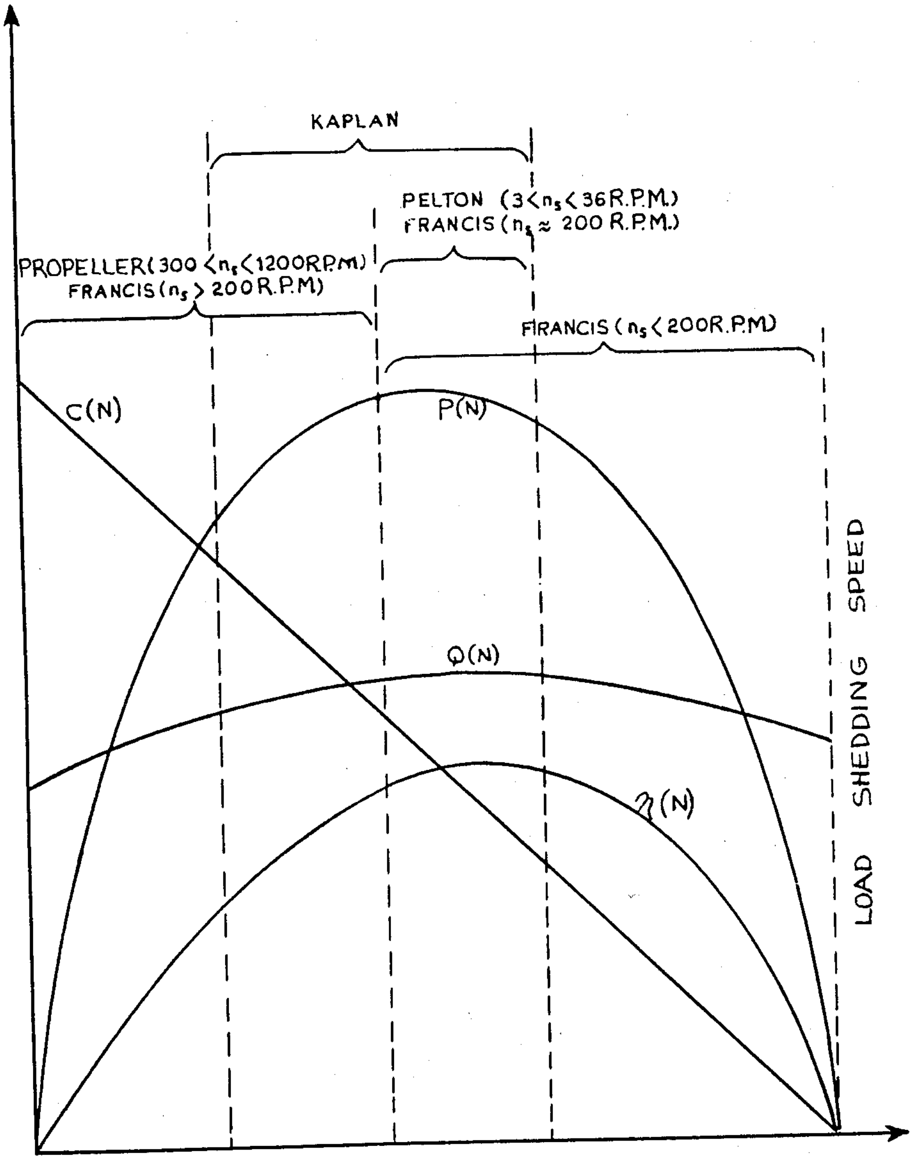
FIG. 4 depicts theoretical curves representing some basic characteristics of different types of turbines for nominal net head and nominal gate opening.

FIGS. 3A–C depict curves representing the turbine water flow Q versus the speed of various turbines at nominal net head and at various gate positions (where $x=1$ for the position corresponding to the maximum opening). One can see that the water flow of a Pelton wheel or of a Francis turbine (FIG. 3A) with $n_s \simeq 200$ R.P.M. are theorically not influenced by the rotation speed. In the Francis turbines where $n_s<200$ R.P.M. and the water is flowing against the centrifugal force, an increase of N results in a decrease of Q (FIG. 3B). Thus, the Francis turbines where $n_s>200$ R.P.M. as well as the Propeller and Kaplan turbines have reversed results (FIG. 3C). In FIG. 4, typical curves of water flow are depicted for various turbines with a constant water head and gate position.

Combining the value of the efficiency characteristic $\eta(Q)$ given from FIG. 2 with the value of the water flow characteristic Q(N) given from FIG. 4, one can obtain the efficiency characteristic $\eta(N)$ depicted in FIG. 4.

The values of Q(N) and $\eta(N)$ can be used in the following equation, to obtain the value of power P generated by the turbine:

$$P=\eta\gamma QH \quad (16)$$

This equation gives the value of the power characertistic P(N), which characteristic is in the shape of a paraboloid, as shown on FIG. 4. The value of the torque C that is equal to the power P divided by the speed N versus the speed N is also shown on the same figure.

The tests on scaled down units are usually represented by topographic curves $Q_{11}$ $(N_{11})$ for water flow; $P_{11}$ $(N_{11})$ for power, and $C_{11}$ $(N_{11})$ for torque, which curves are normally in the shape of lines corresponding to a specified efficiency. These abovementioned characteristics are respectively the same as the following: Q(N); P(N) and C(N).

Figure 5:
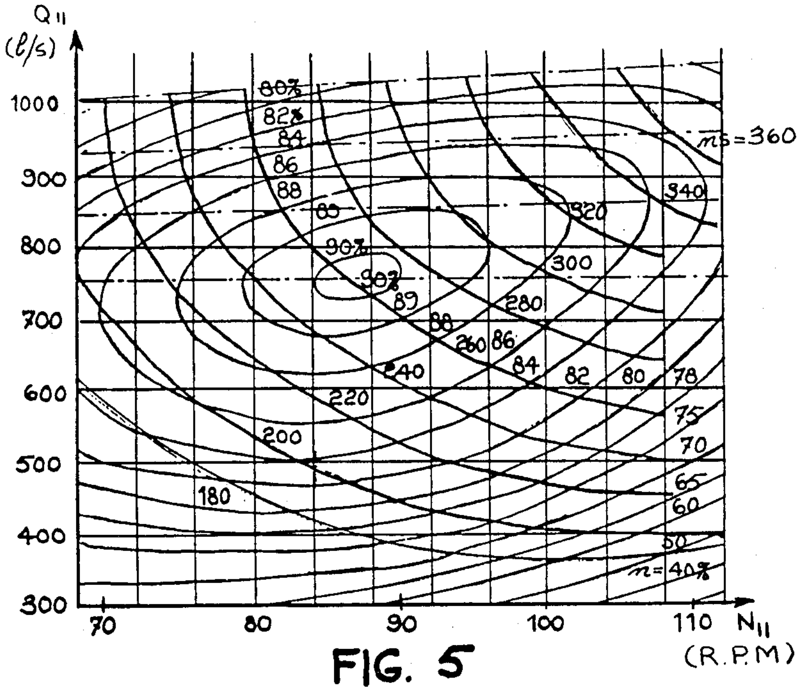
FIG. 5 is a topographic diagram, representing the efficiency of a standard Francis turbine.
Figure 6:
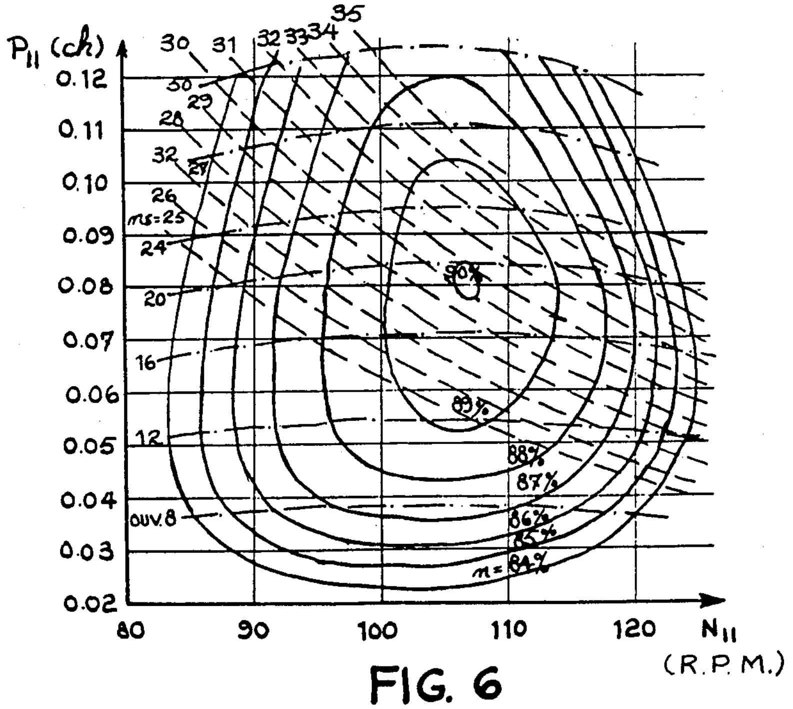
FIG. 6 is a topographic diagram representing the efficiency of a standard Pelton turbine.

In a general manner, (i.e. without any constraint but with the water head H varying) and for a given gate position, the efficiency $\eta$ is simultaneously a function of N and P or of N and Q. To avoid that a third coordinate axis be used, it is preferably to plot both characteristics $P_{11}$ $(N_{11})$ and $Q_{11}$ $(N_{11})$ where each curve (line) represents equal efficiency points joined together. The plotted characteristics look like topographic representation and are therefore called topographic curves. Examples are shown in FIGS. 5 and 6. FIG. 5 illustrates the efficiency ($\eta$) curves, the absolute gate position curves and the specific speed ($n_s$) curves of a Francis turbine versus its speed $N_{11}$ and the water flow $Q_{11}$. FIG. 6 shows the efficiency ($\eta$) curves, the absolute gate position curves and the specific speed ($n_s$) curves of a Pelton turbine versus its speed $N_{11}$ and its power $P_{11}$.

These curves are specific to a turbine which has only one device to adjust the water flow. The Kaplan turbines are not identical to the others because their water flow adjustment is realized by two adjustment devices (or parameters). However, if a turbine is operated with a cam connecting the wheel to distribution, then only one adjustment parameter is used to plot the topographic curve.

It should be noted that, if it is possible to apply the similarity laws to define the dimensions of a turbine from the scaled down model, it is not possible to do the same thing with efficiency for two machines without making a sensible error. The corrections (see equation (21)) that must be made are, however, nearly constant and easy to realize as will be seen hereinafter.

It is important to keep the variables used into the topographic curve simulation within the same range of scale for all the models of turbine. For this purpose, use can be made of the following per unit values:

per unit speed:

$$\bar{\omega} = \frac{\omega_t}{\omega_{to}} = \frac{N}{N_o} \tag{17}$$

per unit net head:

$$\bar{h} = \frac{H}{H_o} \tag{18}$$

per unit water flow:

$$\bar{q} = \frac{Q}{Q_o} \tag{19}$$

per unit generated power:

$$\bar{p} = \frac{P}{P_o} \tag{20}$$

In these equations, $\omega_{to}$, $N_o$, $H_o$, $Q_o$ and $P_o$ are values corresponding to the angular speed, the turbine speed, the net head, the water flow and the generated power respectively, at the nominal point of operation. $\omega_t$ designates the angular speed of the turbine. The variables $N_{11}$, $P_{11}$ and $Q_{11}$ can then be expressed as follows:

$$N_{11} = \left[\frac{DN_o}{\sqrt{H_o}}\right]\frac{\bar{\omega}}{\sqrt{\bar{h}}} \tag{21}$$

$$P_{11} = \left[\frac{P_o}{D^2H_o\sqrt{H_o}}\right]\frac{\bar{p}}{\bar{h}\sqrt{\bar{h}}} \tag{22}$$

$$Q_{11} = \left[\frac{Q_o}{D^2\sqrt{H_o}}\right]\frac{\bar{q}}{\sqrt{\bar{h}}} \tag{23}$$

wherein D, $N_o$, $H_o$, $P_o$ et $Q_o$ are defined as above.

The following explanations will show how, from the power topographic curve $P_{11}$ ($N_{11}$) (because in most of cases, this topographic curve is the only one to be plotted), it is possible to plot the characteristic $\bar{p}_{11}$ ($\bar{\omega}_{11}$) with a nominal gate position, the characteristic $\bar{q}_{11}$ ($\bar{\omega}_{11}$) with a nominal gate position, the characteristic $\bar{p}_{11}$ ($\bar{x}$) with a nominal speed and net head and finally the characteristic $\bar{q}_{11}$ ($\bar{x}$) with a nominal speed and net head, $\bar{p}_{11}$ being the per unit power generated by the turbine for unit turbine diameter and unit net head, $\bar{q}_{11}$ the per unit water flow through the turbine for unit turbine diameter and unit net head and $\bar{\omega}_{11}$, the per unit turbine speed for unit turbine diameter and unit net head. It will also be seen how these four characteristics can be used to realize the global turbine simulation.

At the nominal operating point, the following characteristics are known: $H_o$, $N_o$, $P_o$ and $\eta_o$. These characteristics respectively represent the nominal net head, the nominal speed, the nominal power generated and the nominal efficiency.

The water flow at the nominal operating point can be obtained as folows from equation (16):

$$Q_o = \frac{P_o}{n_o \gamma H_o} \tag{24}$$

The topographic curve $\bar{p}_{11}$ ($\bar{\omega}_{11}$) can then be obtained by changing the scale notation on the topographic curve $P_{11}(N_{11})$ (see FIG. 6), for example, according to the following relationships calculated from equations (21), (22) and (23):

$$\bar{p}_{11} = \frac{\bar{p}}{\bar{h}\sqrt{\bar{h}}} = P_{11}\left[\frac{D^2H_o\sqrt{H_o}}{P_o}\right] \tag{25}$$

$$\bar{\omega}_{11} = \frac{\bar{\omega}}{\sqrt{\bar{h}}} = N_{11}\left[\frac{\sqrt{H_o}}{DN_o}\right] \tag{26}$$

Figure 7:
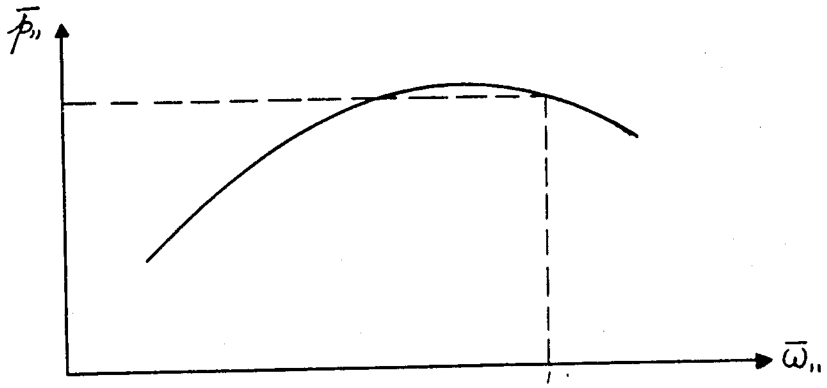
FIG. 7 depicts a curve representing the generated turbine power per unit of turbine diameter, $\bar{p}_{11}$, and unit net head versus angular velocity $\bar{\omega}_{11}$.

This change gives a new topographic curve, from which can be obtained the nominal gate position characteristic (see FIG. 7). It should be noted that on FIG. 7, $\bar{x}$ represents the per unit gate position related to the nominal gate position under a nominal net head.

The topographic curve $Q_{11}$ ($N_{11}$) (see FIG. 5) can be deduced from the topographic curve $P_{11}$ ($N_{11}$), taking points at the intersections of the constant efficiency curves with $P_{11}$ ($N_{11}$) curves and, by applying the following relation inferred from equations (16), (21), (22) and (23):

$$Q_{11} = \frac{P_{11}}{\gamma\eta} \tag{27}$$

As it has already been stated, a correction must be made on the value of the efficiency. This correction is nearly constant and easy to accomplish.

The characteristic $\bar{q}_{11}$ ($\bar{\omega}_{11}$) at the nominal gate position ($\bar{x}=1$) is then deduced (see equations (21), (22) and (23):

$$\bar{q}_{11} = \frac{\bar{q}}{\sqrt{\bar{h}}} = Q_{11}\left[\frac{D^2\sqrt{H_o}}{Q_o}\right] \tag{28}$$

$\bar{q}_{11}$ ($\bar{\omega}_{11}$) can also be obtained from the value of $\bar{p}_{11}$. Indeed, equation (16) gives:

$$\bar{p} = \bar{\eta}\bar{q}\,\bar{h} \tag{29}$$

where $$\bar{\eta} = \eta/\eta_o \tag{30}$$

By using equation (27), we get:

$$\bar{q}_{11} = \frac{\bar{q}}{\sqrt{\bar{h}}} = \frac{\bar{p}_{11}}{\eta} = \eta_o \left[ \frac{D^2 H_o \sqrt{H_o}}{P_o} \right] \left[ \frac{P_{11}}{\eta} \right] \quad (31)$$

The same coefficient $$\frac{D\,H_o \sqrt{H_o}}{P_o}$$

has been used to plot the curve giving the characteristic $\bar{p}_{11}(\bar{\omega}_{11})$.

Figure 8:
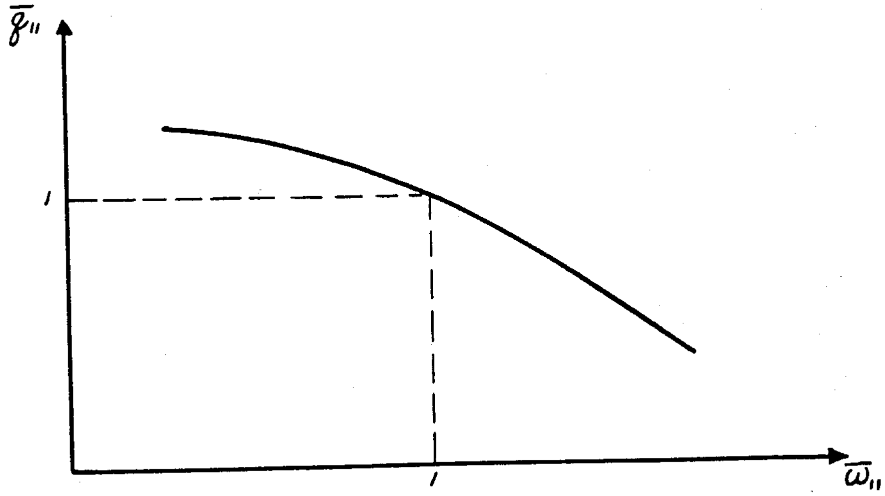
FIG. 8 depicts a curve representing turbine flow per unit turbine diameter and per unit net head, $\bar{q}_{11}$, vs. angular velocity, $\bar{\omega}_{11}$.

FIG. 8 represents this characteristic $\bar{q}_{11}(\bar{\omega}_{11})$ when $\bar{x}=1$.

Figure 9:
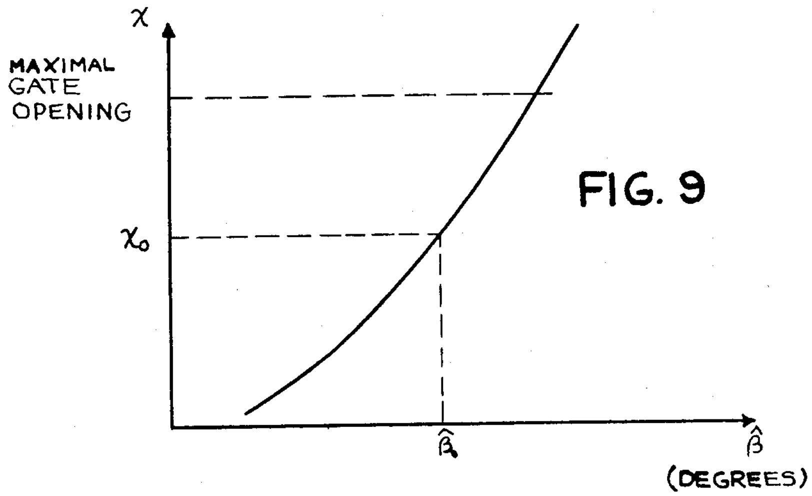
FIG. 9 depicts a curve representing linear gate position X versus angular gate position $\hat{\beta}$ in degrees.

When a topographic curve has to be related to the angle of the mobile paddles of, for example, a Francis, Propeller or Kaplan turbine, instead of being related to the gate position, one can interrelate the paddle angle to the gate position in a single relation. For this purpose, the gate opening characteristic furnished by the manufacturers is used. FIG. 9 illustrates an example of this kind of characteristic showing the course of the gate position versus the mobile paddle angle $\hat{\beta}$.

It should be noted that the maximum gate opening permits to limit the hydraulic power.

The characteristic $\bar{p}_{11}(\bar{x})$ for a nominal speed and a nominal net head can be obtained from the characteristic $\bar{p}_{11}(\bar{\omega}_{11})$, by drawing a vertical line through $\bar{\omega}_{11}=1$ and noting the different points $\bar{p}_{11}$ in relation with $\bar{x}$, using the following relation and the gate position characteristic if necessary:

$$\bar{x} = \frac{\text{gate position}}{\text{nominal gate position}} = \frac{x}{x_o} \quad (32)$$

Figure 10:
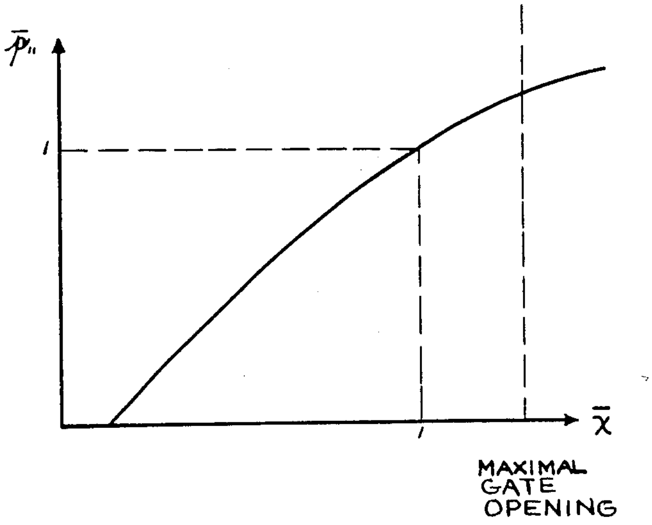
FIG. 10 depicts a curve representing the generated turbine power $\bar{p}_{11}$ per unit turbine diameter and unit net head versus per unit linear gate opening $\bar{X}$.

FIG. 10 illustrates the so obtained characteristic by showing the value of the power $\bar{p}_{11}$ versus the per unit gate position $\bar{x}$, for a nominal speed and nominal net head.

It should be noted that the power $\bar{p}_{11}$ becomes equal to zero at a gate position $\bar{x}$ differing from zero, because of the hydraulic losses and mechanical friction.

Figure 11:
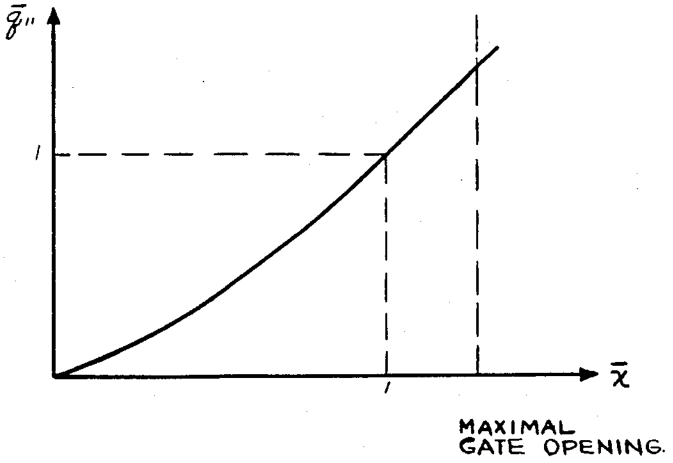
FIG. 11 depicts a curve representing the turbine flow per unit turbine diameter and unit net head $\bar{q}_{11}$ versus per unit linear gate opening $\bar{X}$.

In the same manner as above, the characteristic $\bar{q}_{11}(\bar{x})$ (see FIG. 11) is deduced from the characteristic $\bar{q}_{11}(\bar{\omega}_{11})$. FIG. 11 illustrates the water flow $\bar{q}_{11}$ versus the gate opening $\bar{x}$ for a nominal speed and nominal net head.

Taking into account that the independent parameters are the per unit net head $\bar{h}$, the per unit speed $\bar{\omega}$ and the per unit gate position $\bar{x}$, the problem unresolved is how to generate signals representative of the per unit power $\bar{p}$ and the per unit water flow $\bar{q}$ with the simulator. Indeed, when dynamic perturbations occur, the net head $\bar{h}$ becomes dependent on the water flow $\bar{q}$ as will be seen hereinafter. On the other hand, the speed depends on the inertia of the group consisting of the turbine and generator and on the electric and hydraulic power.

A signal representative of the power $\bar{p}_{11}$ as a function of the angular speed $\bar{\omega}$ and the different gate positions $\bar{x}$ can be produced without introducing excessive error by using a circuit for simulating the characteristic $\bar{p}_{11}(\bar{\omega}_{11})$ at a nominal gate position together with a circuit for simulating the characteristic $\bar{p}_{11}(\bar{x})$ at a nominal speed and nominal net head. In the same way, a signal representative of the water flow $\bar{q}_{11}$ as a function of the angular speed $\bar{\omega}_{11}$ and the different gate positions $\bar{x}$ can be produced without introducing excessive errors by using a circuit for simulating the characteristic $\bar{q}_{11}(\bar{\omega}_{11})$ at a nominal gate position together with a circuit for stimulating the characteristic $\bar{q}_{11}(\bar{x})$ at nominal speed and nominal net head. Thereby, one can obtain an analog diagram of a simulator for simulating all types of hydraulic turbine, as depicted in FIG. 12.

Figure 12:
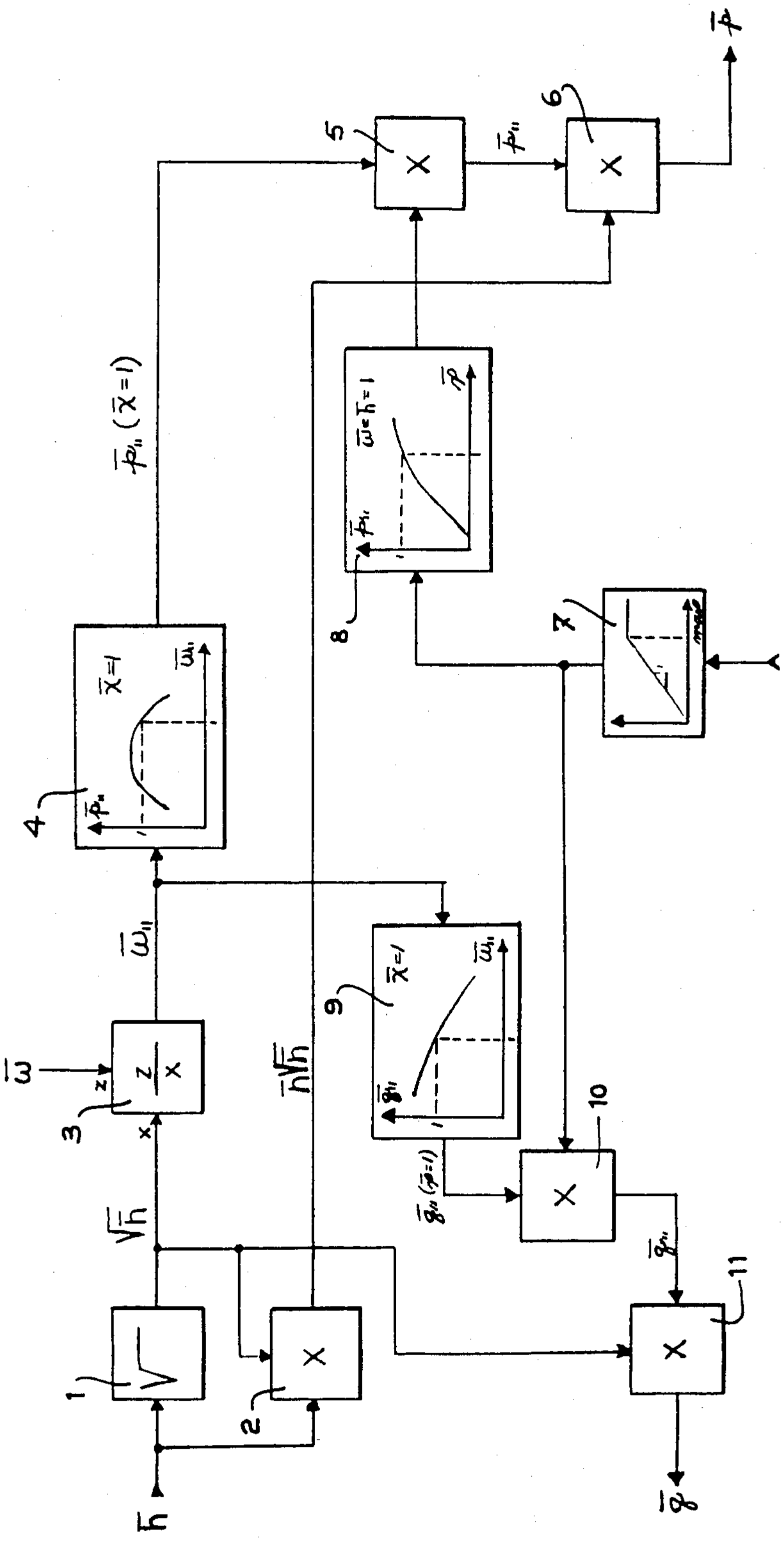
FIG. 12 depicts a block diagram of a hydraulic turbine simulator according to an embodiment of the present invention.

Turning to FIG. 12, block 1 represents a circuit which produces the square root of $\bar{h}$ ($\sqrt{\bar{h}}$) which is a coefficient representative of the net head. In circuit block 3, a divider circuit divides the per unit angular speed $\bar{\omega}$ by $\sqrt{\bar{h}}$, to obtain the per unit turbine speed for unit turbine diameter and unit net head $\bar{\omega}_{11}$. A multiplier circuit 2 then receives as inputs h and $\sqrt{\bar{h}}$ and produces a second coefficient $\bar{h}\sqrt{\bar{h}}$ to be employed in the simulator.

The speed signal $\omega_{11}$ passes through a circuit 4 which has the transfer function $\bar{p}_{11}(\bar{\omega}_{11})\ \bar{x}=1$. Simultaneously, a signal $\bar{x}$, representative of the gate position and limited to a value $\bar{x}_{max}$ by a circuit 7, passes through a circuit 8 which imposes the transfer function $\bar{p}_{11}(x)_{\bar{\omega}}=\bar{h}=1$. The two signals $\bar{p}_{11}$ ($\bar{p}_{11}(\bar{x}=1)$ and $\bar{p}_{11}(\bar{\omega}=\bar{h}=1)$ obtained are multiplied together by a multiplier circuit 5 in order to obtain a signal $\bar{p}_{11}$ which takes into account both the gate position $\bar{x}$ and the angular speed $\bar{\omega}_{11}$. The resulting signal $\bar{p}_{11}$ is then inputted to a multiplier circuit 6 in which the signal $\bar{p}_{11}(\bar{x},\bar{\omega}_{11})$ is multiplied by the coefficient $\bar{h}\sqrt{\bar{h}}$ in order to obtain a standardized signal representative of the per unit power $\bar{p}$ which is not related to the net head unit nor to the wheel diameter unit of the turbine as is the signal $\bar{p}_{11}$.

Circuit 9 simulates the transfer function $\bar{q}_{11}(\bar{\omega}_{11})_{\bar{x}=1}$. There is no circuit for simulating the transfer function $\bar{q}_{11}(\bar{x})$ inasmuch as this function, as seen from FIG. 11, can generally be replaced by a generally linear function drawn from the origin. Thus function can be simulated using a simple wire while introducing almost no error.

The signals from circuits 9 and 7 relating to $\bar{q}_{11}$ are then multiplied together by a multiplier circuit 10. The result is then scaled by using a multiplier circuit 11 resulting in the signal $\bar{q}=\bar{q}_{11}\sqrt{\bar{h}}$ which is representative of the per unit value of the water flow.

Thus, the simulator gives simulated results such as the generated power $\bar{p}$ and the water flow q from parameters such as the net head $\bar{h}$, the relative angular speed $\omega$ and the gate position $\bar{x}$.

This simulator can be simplified by replacing the circuits simulating the transfer function by circuits giving approximate results which are easier to realize.

The characteristic $\bar{p}_{11}(\bar{\omega}_{11})_{(\bar{x}=1)}$ looks like a parabola. To simulate this function, a circuit having this characteristic is used. This parabola, shown in FIG. 13, for $\bar{x}=1$, has the following mathematical equation:

$$\bar{p}_{11} = A - B(\bar{\omega}_{11} - C)^2 \text{ for } \bar{x}=1 \quad (33)$$

Figure 13:
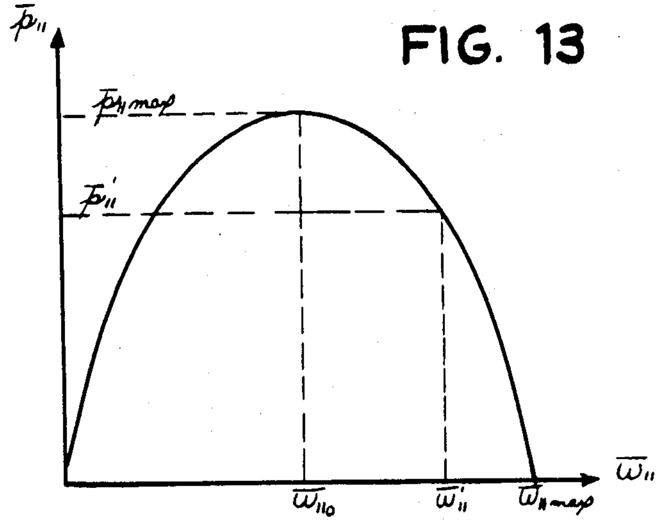
FIG. 13 depicts a curve representing the normalized turbine power $\bar{p}_{11}$ versus the angular velocity $\bar{\omega}_{11}$.

The constants A, B and C are calculated from the function shown in FIG. 13:

$$A = \bar{p}_{11}\ \text{max} \quad (34)$$

$$B = \frac{\bar{p}_{11}\ \text{max} - \bar{p}_{11}'}{(\bar{\omega}_{11}' - \bar{\omega}_{110})^2} \quad (35)$$

$$C = \bar{\omega}_{110} \quad (36)$$

It should be noted that $\bar{p}_{11}$ becomes equal to zero when $\bar{\omega}_{11}=\bar{\omega}_{11}$ max.

Then, the following equation can be calculated by combining equations (33), (34), (35) and (36):

$$\bar{p}_{11}\Big|_{\bar{x}=1} = \bar{p}_{11\,max} - \frac{(\bar{p}_{11\,max} - \bar{p}'_{11})}{(\bar{\omega}'_{11} - \bar{\omega}_{110})^2}(\bar{\omega}_{11} - \bar{\omega}_{110})^2 \quad (37)$$

Use can be made of $\bar{p}'_{11}$, $\bar{\omega}'_{11}$ as proximate data if $\omega_{11}$ max cannot be obtained with accuracy.

Taking into account that the characteristic $\bar{p}_{11}(\bar{\omega}_{11})_{(\bar{x}=1)}$ is not an exact parabola, $\bar{p}_{11}(0)_{(\bar{x}=1)}$ is not equal to zero. Actually, the value of $\bar{p}_{11}(0)$ is given by the following expression:

$$\bar{p}_{11(0)} = \bar{p}_{11\,max} - \frac{\bar{\omega}^2_{110}(\bar{p}_{11\,max} - \bar{p}_{11}')}{(\bar{\omega}_{11}' - \bar{\omega}_{110})^2} \quad (38)$$

This fact does not constitute a disadvantage because the simulator will not be employed in practice for speeds $\bar{\omega}_{11}$ that are low or equal to zero. If use is made of the values $\bar{p}'_{11}$ and $\bar{\omega}'_{11}$, $\bar{\omega}_{11}$ max will become:

$$\bar{\omega}_{11\,max} = \bar{\omega}_{110} + (\bar{\omega}'_{11} - \bar{\omega}_{110})\sqrt{\frac{\bar{p}_{11\,max}}{(\bar{p}_{11\,max} - \bar{p}'_{11})}} \quad (39)$$

This value represents the load shedding speed.

Then, it is possible to simulate the turbine in such a manner that the error introduced when $\omega_{11}$ is ranging between 0.5 $\bar{\omega}_{11}$ max and $\bar{\omega}_{11}$ max will be very small.

The characteristic $\bar{q}_{11}(\bar{\omega}_{11})_{(\bar{x}=1)}$ can be represented by a straight line without introducing excessive error. The mathematical equation of this straight line, shown in FIG. 14, is:

$$\bar{q}_{11}\Big|_{\bar{x}=1} = D + E\bar{\omega}_{11} \quad (40)$$

Figure 14:
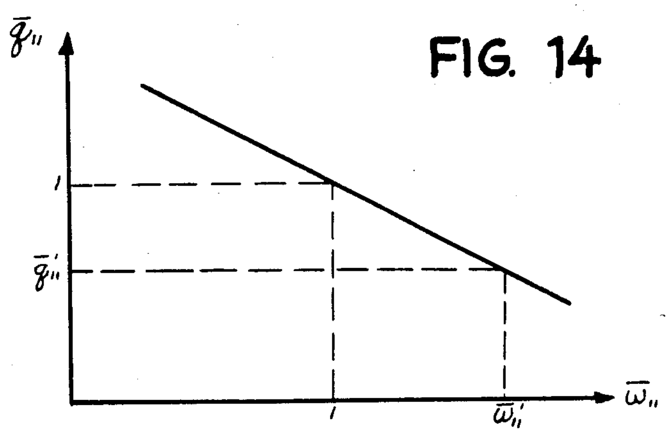
FIG. 14 depicts a curve representing the normalized turbine flow $\overline{q}_{11}$ versus the normalized turbine speed $\overline{\omega}_{11}$.

Constants D and E are deduced from the characteristic $\bar{q}_{11}(\bar{\omega}_{11})_{\bar{x}=1}$ shown in FIG. 14, and are calculated by the following expression:

$$D = \frac{\bar{q}'_{11} - \bar{\omega}'_{11}}{(1 - \bar{\omega}'_{11})} \quad (41)$$

$$E = \left[\frac{1 - \bar{q}'_{11}}{1 - \bar{\omega}'_{11}}\right] \quad (42)$$

By combining equations (40), (41) and (42) we get:

$$\bar{q}_{11}\Big|_{\bar{x}=1} = \left[\frac{\bar{q}'_{11} - \bar{\omega}'_{11}}{1 - \bar{\omega}'_{11}}\right] + \left[\frac{1 - \bar{q}'_{11}}{1 - \bar{\omega}'_{11}}\right]\bar{\omega}_{11} \quad (43)$$

The simulator according to the present invention should take into account the inertia of the group formed by the turbine and the generator as well as the mechanical friction of the turbine.

The expression of the generated torque $\tau_t$ of the turbine is given by the following equation:

$$\tau_t = (P/\omega_t) \quad (44)$$

Expressed in per unit value, the above expression becomes:

$$\bar{\tau}_t = \frac{\tau_t}{\tau_{ot}} = \frac{P/P_o}{\omega_t/\omega_{to}} = \frac{\bar{p}}{\bar{\omega}} \quad (45)$$

$$\tau_{ot} = \frac{W_{a,\,base}\cos\phi}{\omega_{to}} = \frac{P_o}{\omega_{to}} \quad (46)$$

where $\tau_{ot}$ represents the nominal torque generated (for a nominal speed), $W_{a,\,base}$ represents the basic power expressed in volts (effective value)-amperes (effective value) for the three phases of the generator and, finally, $\cos\phi$ represents the nominal power factor of this generator.

The equation giving the torque as a function of the speed reads as follows:

$$\tau_t - \tau = I\frac{d}{dt}(\omega - \omega_o) \quad (47)$$

wherein $\tau$ represents the resisting torque of the generator, I the inertia moment of the group formed by the turbine and the generator and $\omega_o$ is the nominal angular speed. Expressed in per unit value, we get:

$$\bar{\tau}_t - \frac{\bar{\tau}}{\cos\phi} = T_m\frac{d}{dt}\Delta\bar{\omega} \quad (48)$$

$$T_m = I\omega_o/\tau_{ot} \quad (49)$$

where $T_m$ represents the mechanical time constant of the group formed by the turbine and the generator.

Taking into account the form of the characteristic $\bar{p}_{11}(\bar{x})$ $(\bar{\omega}=\bar{h}=1)$ as given in FIG. 10, one can see that $\bar{p}_{11}$ becomes equal to zero before $\bar{x}$ becomes equal to zero. Then, the turbine, the generator and the water absorb a quantity of power at nominal speed and nominal net head ($\bar{p}_{fo}$). If we add $\bar{p}_{fo}$ to $\bar{p}_{11}$, then the curve will pass through the origin. The variables $\bar{p}_{11}$ $(\bar{\omega}=\bar{h}=1)$, $\bar{p}_{11}$ and $\bar{p}$ of FIG. 12 represents $\bar{p}_{11g}$ $(\bar{\omega}=\bar{h}=1)$, $\bar{p}_{11g}$ and $\bar{p}_g$ respectively and are related to $\bar{p}_{11}$ $(\bar{\omega}=\bar{h}=1)$, $\bar{p}_{11}$ and $\bar{p}$ according to the following expressions:

$$\bar{p}_{11g}(\bar{\omega} = \bar{h} = 1) = \bar{p}_{11}(\bar{\omega} = \bar{h} = 1) + \bar{p}_{fo} \quad (50)$$

$$\bar{p}_{11g} = \bar{p}_{11} + \bar{p}_{11}(\bar{x} = 1)\bar{p}_{fo} \quad (51)$$

$$\bar{p}_g = \bar{p} + \bar{h}\sqrt{\bar{h}}\,\bar{p}_{11}(\bar{x} = 1)\bar{p}_{fo} \quad (52)$$

The variable $\bar{\tau}_t$ of the equations (45) and (46) will become $\bar{\tau}_{tg}$ which can be combined with $\tau_t$ to give:

$$\bar{\tau}_{tg} = \bar{\tau}_t + \bar{\tau}_g \quad (53)$$

$$\bar{\tau}_g = \frac{\bar{h}\sqrt{\bar{h}}}{\bar{\omega}}\bar{p}_{11}(\bar{x} = 1)\bar{\tau}_{go} \quad (54)$$

$$\bar{\tau}_{go} = \bar{p}_{fo} \quad (55)$$

Then, the equations (48) and (49) become:

$$\bar{\tau}_{tg} - \frac{\bar{\tau}}{\cos\phi} - \bar{\tau}_g = T_m \frac{d}{dt}\overline{\Delta\omega} \tag{56}$$

In the above expression, it is assumed that $\bar{\tau}_g = \bar{\tau}_{go}$ in order to simplify the friction representation. The error produced by considering $\bar{\tau}_g$ as a constant is negligible.

This fact allows the operator to control the value of the quantity of friction independently of the turbine in order to obtain a more flexible simulator.

Figure 15:
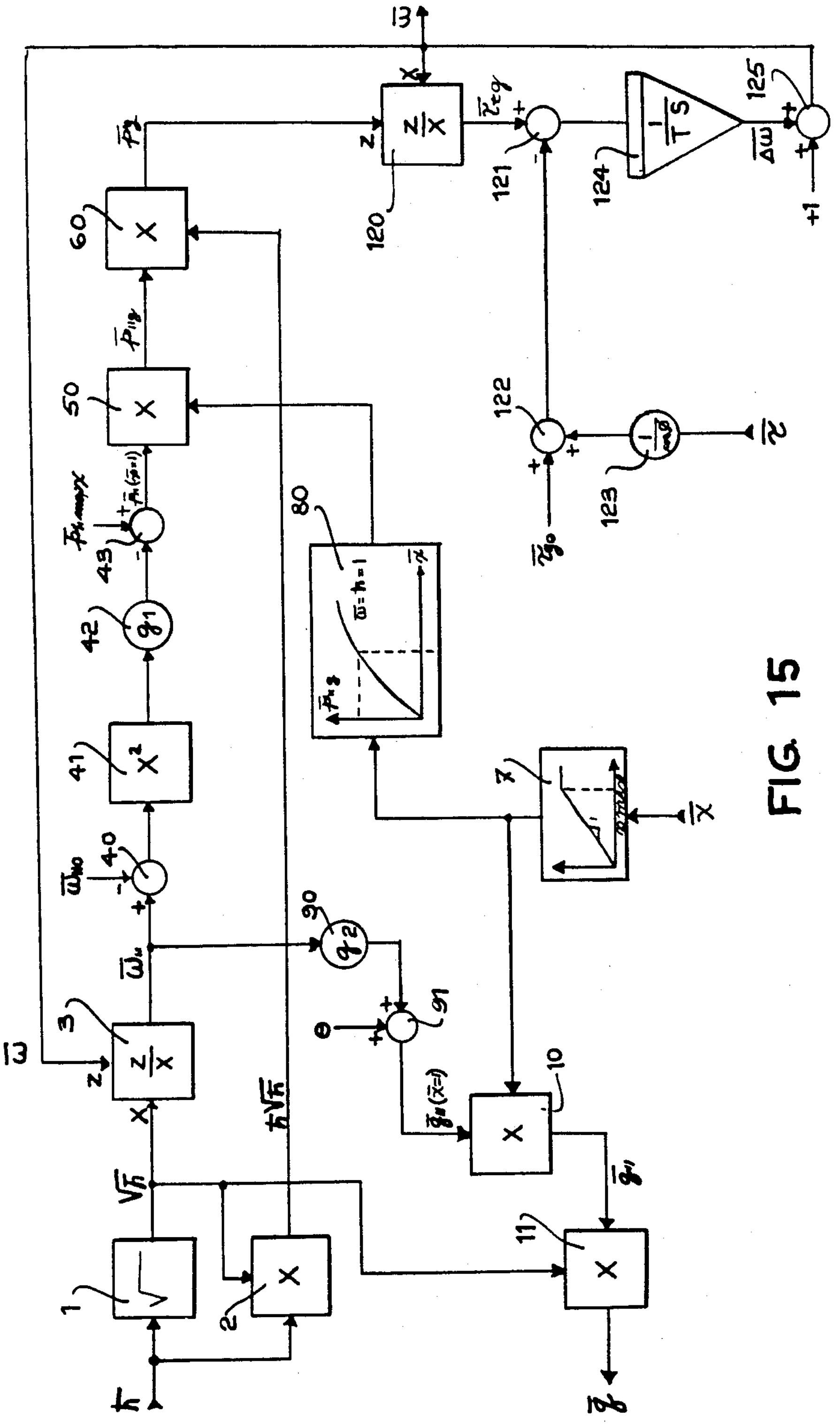
FIG. 15 depicts another embodiment of the sinmulator of FIG. 12.

Considering the preceding calculated simplifications and the proposed representation of the inertia and friction of the group formed by the turbine and the generator, the analog diagram of the hydraulic turbines of FIG. 12 is simplified and becomes the global analog diagram of the hydraulic turbines depicted in FIG. 15.

The simulator circuit 4 of the FIG. 12 has been replaced by a first subtractor circuit 40 subtracting the value $\bar{\omega}_{110}$, a circuit giving the square of its input signal 41, an amplifier 42 with a gain $$g_1 = \frac{\bar{p}_{11\,max} - \bar{p}_{11}}{(\bar{\omega}_{11}' - \bar{\omega}_{110})^2}$$

and a subtractor circuit 43 which subtracts the output of the amplifier from the value $\bar{p}_{11\,max}$ and reverses the result. The multiplier circuit 50 receives the resulting signal at one of its inputs and a signal from the simulator circuit 80 reproducing the above-mentioned function $\bar{p}_{11g}(\bar{x})$ at its other input and generates a power intermediary signal $\bar{p}_{11g}(\bar{\omega}_{11}, \bar{x})$ which, multiplied by the coefficient $\bar{h}\sqrt{\bar{h}}$ in the multiplier circuit 60, produces the signal $\bar{p}_g$ representative of the generator power. The signal $\bar{p}_g$ is then divided by the per unit angular speed in the divider circuit 120 to produce the signal $\bar{\tau}_{tg}$ which passes through the subtractor circuit 121 which subtracts from the signal $\bar{\tau}_{tg}$ a signal representative of the sum of the signal $\bar{\tau}_{go}$ (representative of the torque corresponding to the power absorbed by the turbine, the generator and the water when the generator is turning over), and the signal $\bar{\tau}/\cos\phi$ (which is produced by dividing the torque signal in the amplifier 123 by cos $\phi$ which represents the nominal power factor of the generator), this summing being performed by the adder circuit 122. The signal at the output of the circuit 121 is integrated by the integrator 124 and the result is the signal $\overline{\Delta\omega}$ of the equations (48) and (49). As $\overline{\Delta\omega}$ is equivalent to $(\omega-\omega_o)/w_o$ it is sufficient to add 1 with the adder circuit 125 to obtain the signal $\bar{\omega}$ representative of the per unit angular speed.

In addition, the simulator circuit 9 of FIG. 12 is now replaced (FIG. 15) by an amplifier 90 of gain $$g_2 = \frac{1 - \bar{q}_{11}'}{1 - \bar{\omega}_{11}'}$$

and an adder circuit 91 adding the value $$\theta = \frac{\bar{q}_{11}' - \bar{\omega}_{11}'}{1 - \bar{\omega}_{11}'}$$

in order to simulate the characteristic $\bar{q}_{11}\ \bar{\omega}_{11})$ $(\bar{x}=1)$ This simulator now uses only two independent variables as inputs: the per unit net head $\bar{h}$ and the per unit gate position $\bar{x}$ and gives as oiutputs the per unit water flow $\bar{q}$, the per unit generated power $\bar{p}_g$ and the per unit angular speed $\bar{\omega}$.

Figure 16:
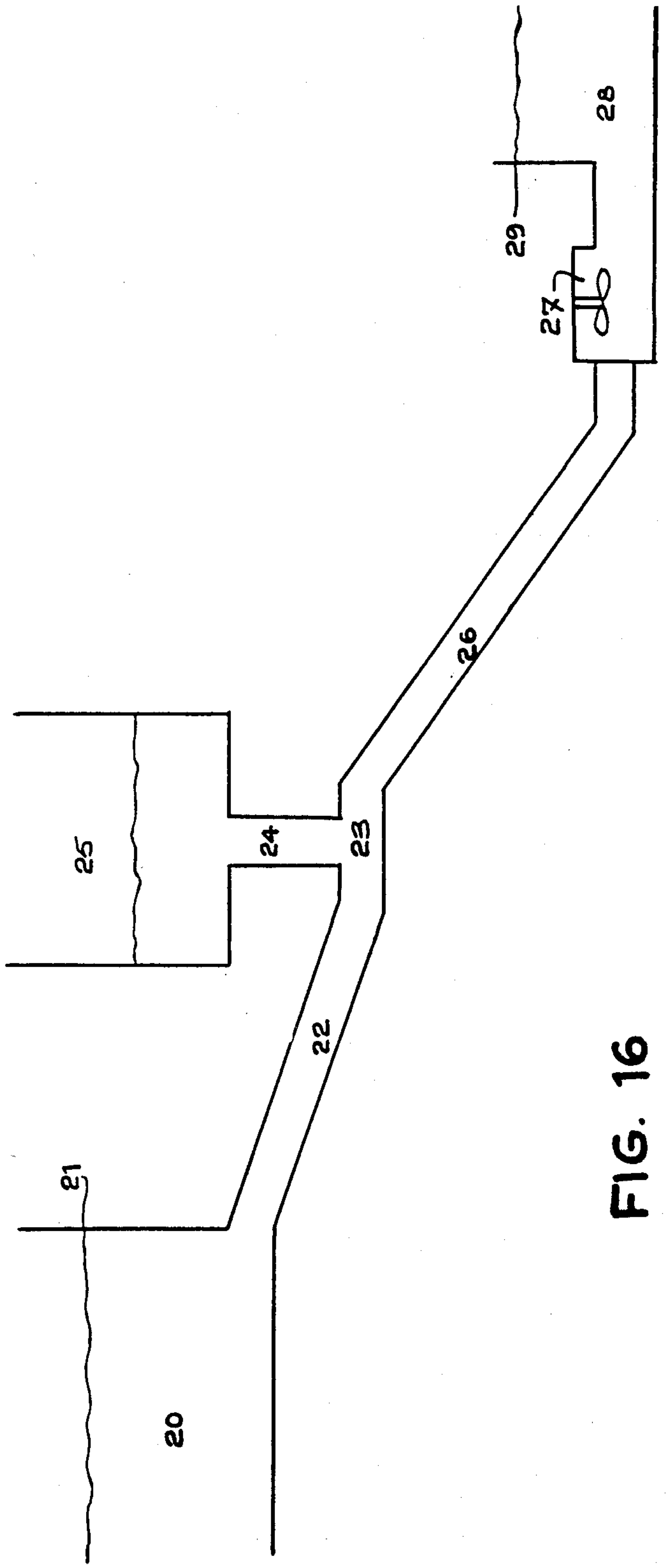
FIG. 16 schematically illustrates a standard assembly of hydraulic ducts.

FIG. 16 represents a typical physical diagram of hydraulic ducts where only the penstock will be considered.

The general hydraulic circuit includes a first reservoir 20 at an upflow level 21, followed by an inlet duct 22 conducting to a load adduction area 23 where there is connected, by the junction duct 24, an equilibrium chamber 25. Then, there is a penstock 26 which will be the only considered element in this circuit and finally, after the turbine 27, a second reservoir 28 at a downflow level 29 where load restitution is done.

The dynamic equation of the penstock flow is then:

$$H_t = H + \phi + i \tag{57}$$

where $H_t$ represents the total water net head in feet between the upflow level and the downflow level, the total water energy losses in the penstock in feet and i the water inertia in feet, $\phi$ and i being given by the following expressions:

$$\phi = \theta s/\gamma S \tag{58}$$

$$i = l/gS\ dQ/dt \tag{59}$$

where $\theta$ represents the friction losses by unity of interior surface of the duct in lbs/ft$^2$, s the interior surface of the duct in feet $^2$, $\gamma$ the specific weight of the water in lbs/ft$^3$, S the section in feet$^2$, l the length in feet and g the gravity acceleration in feet/sec$^2$.

It is assumed that the water energy losses ($\phi$) are proportional to the square of the flowing speed and that these same losses are independent of the flowing direction, then the following expression can be written:

$$\phi = \phi_o \bar{q}^2 \tag{60}$$

where $\theta_o$ represents the water energy losses in the penstock in feet, associated to the reference water flow $Q_o$.

Then, expressed in per unit value, with $H_o$ as nominal net head and $Q_o$ as nominal water flow, the following expressions are calculated:

$$\bar{h}_t = \frac{H_t}{H_o} = \bar{h} + \bar{\Phi}_o \bar{q}^2 + Tl \frac{d\bar{q}}{dt} \tag{61}$$

$$\bar{\Phi}_o = \frac{\phi_o}{H_o} \tag{62}$$

$$Tl = \frac{l\,Q_o}{gS\,H_o} \tag{63}$$

Tl being the water starting time in the penstock expressed in seconds.

The global expression joining the net head "$\bar{h}$" to the water flow "$\bar{q}$" of the penstock, including the schroll case if this one exists, becomes:

$$\bar{h} = \bar{h}_t - \phi_o{}^* \bar{q}^2 - Tl^* \frac{d\bar{q}}{dt} \tag{64}$$

with $$\bar{h}_t = 1 + \bar{\Phi}_o{}^* \tag{65}$$

wherein the variables provided with a star * indicate that the schroll case is considered.

Figure 17:
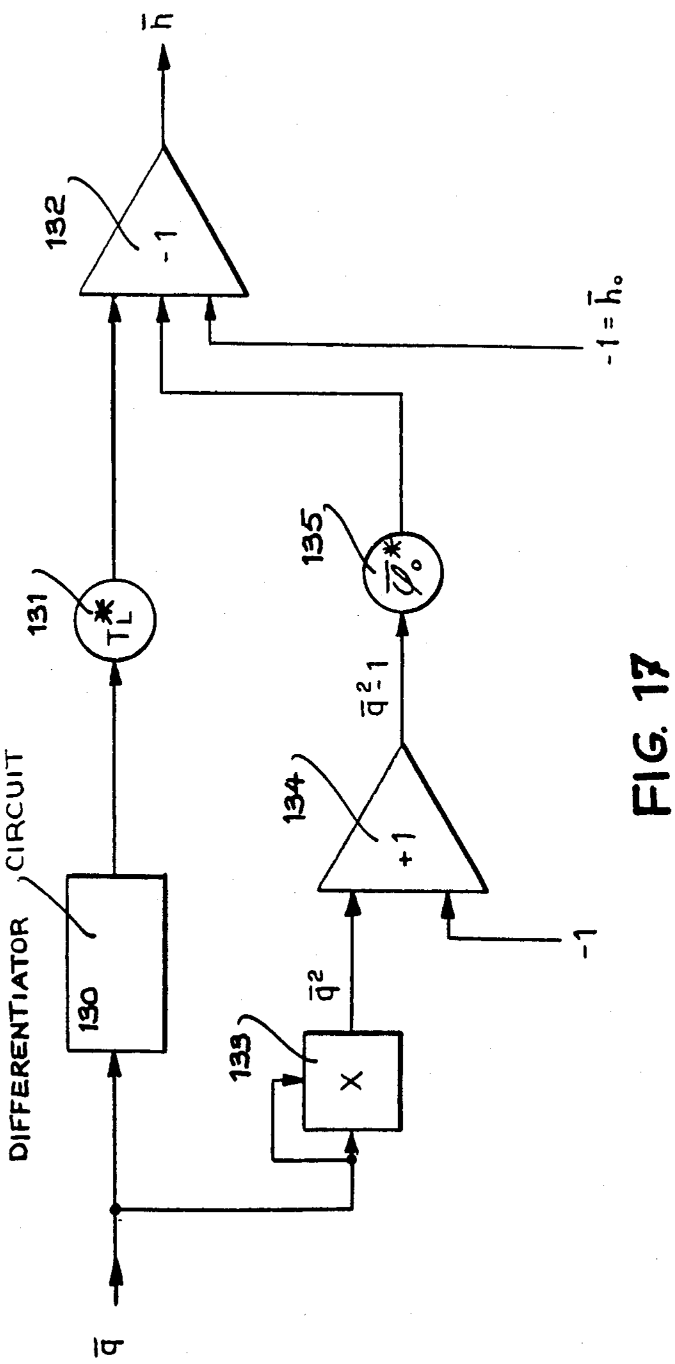
FIG. 17 is a schematic diagram of an electronic circuit which may be added to the simulator for simultaneously simulating a penstock.

FIG. 17 illustrates the analog diagram of the circuit simulating the penstock including the schroll case if this one is considered in the system.

The circuit depicted in FIG. 17 receives as input a signal $\bar{q}$ representative of the per unit water flow and obtained, for example, with the circuits of the FIG. 12 or 15. In a first branch, the signal $\bar{q}$ is differentiated by the circuit 130, then amplified by the factor Tl* with the amplifier circuit 131. The resulting signal is applied to the first input of an adder circuit 132. In a second branch, the signal $\bar{q}$ passes through the multiplier circuit 133 giving as output the square of $\bar{q}$. The signal $\bar{q}^2$ is then inputted to the first input of a subtractor circuit 134 with a signal equal to the value 1 inputted to the second input to generate the resulting signal $\bar{q}^2-1$ which is then amplified by the factor $\bar{Q}_o$* in amplifier circuit 135. The resulting signal is applied to the second input of the adder circuit 132. The fixed value −1, representative of $\bar{h}_o$, constitutes the third input of the circuit 132. This circuit 132 adds the signals received by its inputs and reverse the result to produce the signal $\bar{h}$ representative of the per unit net head. It should be noted that instead of calculating the expression Tl*S with the amplifier circuit 131, one can realize a function as such $$\frac{Tl*S}{1+\frac{Tl*S}{200}}.$$

having a time constant (Tl*/200) in this case) which is completely negligible.

Figure 18:
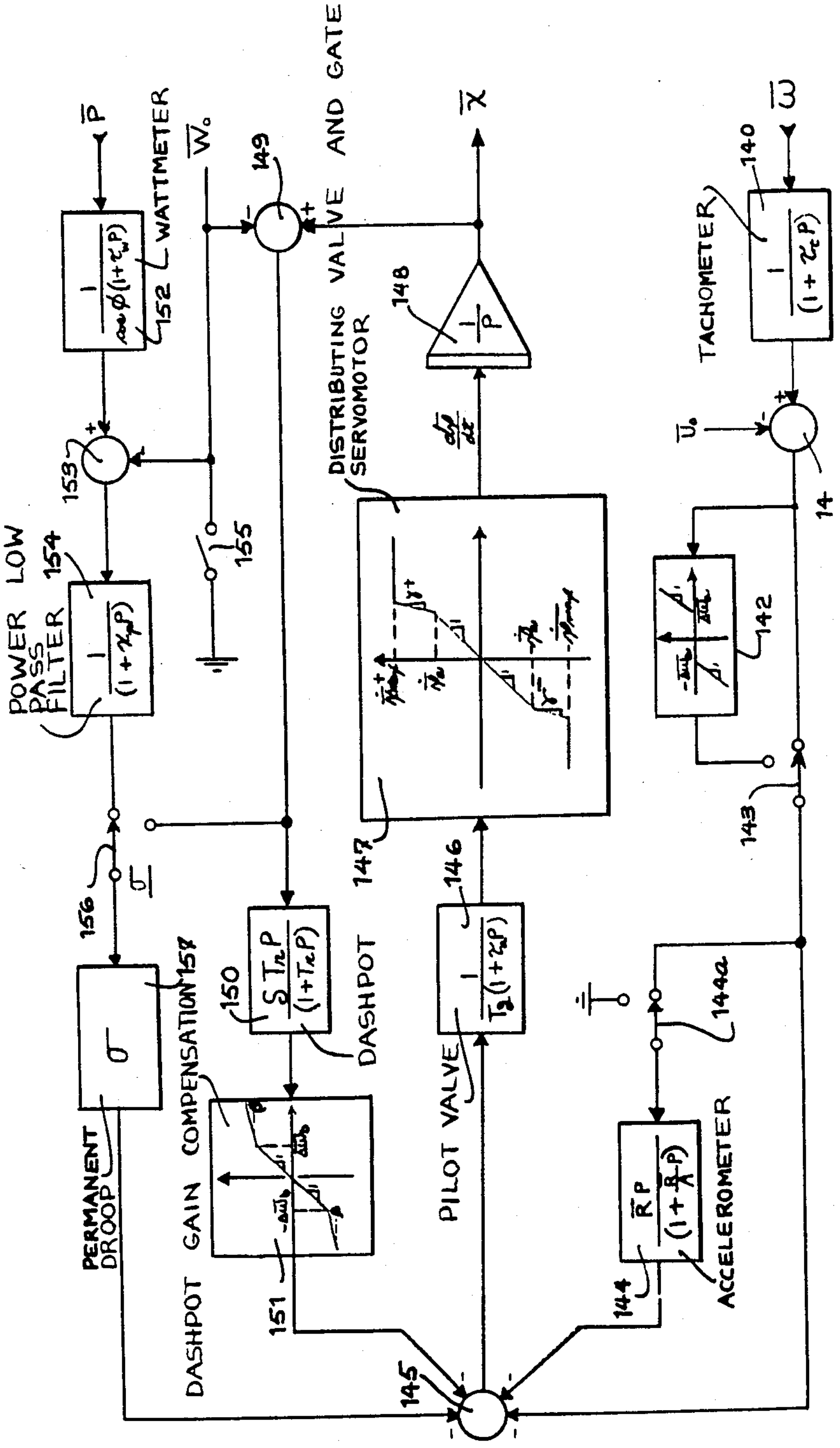
FIG. 18 is a schematic diagram of another electronic circuit which may be added to the simulator for simultaneously simulating a speed and power regulator.

FIG. 18 illustrates an analog diagram of the simulator of the speed and power regulator. This simulator takes into account all the important nonlinearities and enables the simulation of all types of regulators.

The simulator operation starts with a speed $\bar{\omega}$ as measured by the intermediary of a tachometer 140 having a time constant $\tau_t$. This measured speed is then compared to the reference speed $\bar{U}_o$ with a comparator 141 which supplies a threshold suppressor 142 giving an insensibility $\pm\bar{\Delta\omega}_a$ to the turbine. Indeed, by the operation of such a suppressor, the regulator does not respond to very low frequency perturbations when too much power is delivered by the generator. The signal at the output of the threshold suppressor, or the signal at the output of the comparator according to the position of the switch 143, supplies the accelerometer 144 (based on the position of switch 144*a*) and the pilot valve 146 by the intermediary of the adder reverser circuit 145. The accelerometer 144 has a per unit gain $\bar{R}$ and a time constant $\bar{R}$A (A being a constant value) and supplies a signal representative of the differentiated speed to the pilot valve 146. An adder reverser circuit 145 acts between the accelerometer 144 and the pilot valve 146.

The pilot valve 146 has a gain $1/T_g$ and a time constant $\tau_a$ and supplies a circuit simulating the distributing valve and gate servomotor 147 having a unitary gain of integration when the absolute speed of displacement of the servomotor $|\dot{\bar{x}}|$ is equal to or lower than $|\dot{\bar{x}}_a|$ and a dynamic gain of integration $\gamma+$ and $\gamma-$ when the speed is located respectively between $\dot{\bar{x}}_a$ and $\dot{\bar{x}}_{max}+$ and $-\dot{\bar{x}}_a$ and $-\dot{\bar{x}}_{max}-$, the servomotor speed being limited to the value of $\dot{\bar{x}}_{max}+$ and $-\dot{\bar{x}}_{-max}$. The output of circuit 147 is a signal $\dot{\bar{x}}=d\bar{x}/dt$ which is integrated by the integrator circuit 148 in order to arrive at a signal $\bar{x}$, which is representative of the gate position.

The signal $\bar{x}$, representative of the gate position, supplies the circuit of the dashpot 150 having a transcient droop "δ" and a relaxation time "$T_r$". The damping action of the dashpot is reduced at load shedding in order to allow a maximum value for the closing speed of the gate; this action being performed by dashpot gain compensation circuit 151 which reduces the transcient droop "δ" to the value "βδ" when the absolute value of the equivalent deviation of the speed oversteps $|\Delta\bar{\omega}_b|$. The resulting signal acts on the pilot valve 146 by the intermediary of a third input of the circuit 145 in order to damp any power and/or speed oscillations.

The measurement of the generated power used to define the frequency-power relation of the generator is also supplied as a fourth input to the circuit 145. This power measure is represented by the permanent droop σ of the circuit 157 and is generated from the signal of the gate position $\bar{x}$ or from the measurement of the instantaneous power $\bar{P}$ generated by the generator according to the position of the switch 156. In the first case, a measure of power is realized by the measure of the gate position / as compared with the reference power $\bar{W}_o$ in a subtractor circuit 149. In the second case, the instantaneous power $\bar{P}$ generated by the generator and measured by a wattmeter 152 having a time constant $\tau_w$ is compared to a reference power signal $\bar{W}_o$ in a subtractor circuit 153 and the resulting signal passes through the power filter circuit 154 having a time constant $\tau_p$ in order to obtain the real power. It should be noted that to simulate a condition wherein the generator is out of synchronism with the network, the power reference $\bar{W}_o$ can be cancelled by the switch 155 and this sudden variation of reference causes the closing of the gate at the maximum speed by the intermediary of the dashpot.

Setting the accelerometer 144 out of the circuit, with the switch 144*a* for example, the speed regulator becomes a regulator with proportional and integrating action (with indirect tachometric adjustment and temporary feedback). With the transcient droop constant β equal to zero (in the circuit 150), the regulator becomes a regulator with composite accelerotachometric adjustment with proportional and integrating action. Finally, omitting the two preceding limitations, the regulator becomes a regulator with proportional, integrating and derivating action (composite accelerotachometric adjustment with transitory feedback).

If it is desired to limit the use of the simulator to a single type of regulator, it is possible to realize a simulator circuit containing only the components specific to that regulator. A more versatile simulator, having a maximum number of possibilities can be realized, by providing the simulator with all the possible components and selecting the desired operation mode with commutation switches.

It should be noted that in the diagram of FIG. 18, the use of the variable P is often replaced by an s or jw by some authors. The illustrated circuits as $1/(1+\tau P)$ or $AP/(1+\tau P)$ are well known in the technology of function simulators and feedback devices. For example, the function $1/(1+\tau P)$ can be realized with a common operational amplifier having an integrating function or a filter, τ being its time constant.

The object of the present invention is to provide a particular simulator, utilizing well known circuits as for example, adders, integrators, etc. realized with operational amplifiers, analog multipliers and dividers and other conventional components. The different constants, gains, etc., are adjusted according to the simulated turbine and/or the obtained results on scale-down models, foreseeing the variable elements (resistances, capacities, commutators, etc.) to allow the adjustment of the constants, gains, etc. at the required values.

It is possible to slightly modify the exact diagram of the simulator, transforming some equations, for example. Of course, these modifications would not change the simulator nature.

The foregoing description of the preferred embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be denied by the claims appended hereto.

What is claimed is:

1. An electronic simulator responsive to simulated working conditions, for the analog simulation of a hydraulic turbine, comprising:

(a) first means for transforming said working conditions into standardized signals;

(b) second means for transforming said standardized signals by transfer functions, said second means including a plurality of simulator circuits for simulating said transfer functions, each simulator circuit receiving at least one of said standardized signals as an input and generating an output signal representative of an intermediary result; and (c) third means for receiving at least part of said intermediary results and for generating signals representative of the turbine operation.

2. The simulator of claim 1, wherein said working conditions represent the position of a gate for controlling water flow in said turbine and the water head of said turbine.

3. The simulator of claim 2, wherein said transfer functions simulate non-linear operations of said turbine and wherein each of said transfer functions is representative of an operation of said turbine with respect to a specific input condition given as an input signal, other conditions being held constant.

4. The simulator according to claim 3, wherein said means comprises a first circuit for transforming a value of net head into a first coefficient and a second circuit for dividing a signal representative of per unit turbine angular speed by said coefficient, said second circuit generating an output signal representative of the per unit turbine angular speed per unit turbine diameter and unit net head.

5. The simulator according to claim 4, wherein said second circuit is connected to an input of a first of said plurality of simulator circuits, said first simulator circuit being operable for generating a first signal representative of the per unit power generated by the turbine for a unit turbine diameter and unit net head.

6. The simulator according to claim 5, wherein said first simulator circuit comprises a first subtractor circuit for subtracting a speed value from the output of said second circuit, a squaring circuit connected to said first subtractor for generating a square of the subtractor circuit output signal, an amplifier connected to said squaring circuit, and a second subtractor circuit connected to said amplifier for generating a difference signal between an output of said amplifier and an input signal.

7. The simulator according to claim 6, wherein:

(a) said first subtractor circuit subtracts a value representative of the per unit turbine angular speed per unit turbine diameter and unit net head corresponding to the maximal power from said signal representative of per unit angular speed per unit turbine diameter and unit per head;

(b) said amplifier circuit has a gain $g_1$ and generates an amplified signal; and (c) the input signal of said second subtractor circuit represents the per unit maximal power of the turbine per unit turbine diameter and unit net head.

8. The simulator circuit of claim 7, wherein said gain, $g_1$, corresponds to the following function:

$$g_1 = \frac{\bar{p}_{11}\,\max\bar{p}_{11}'}{(\bar{\omega}_{11}' - \bar{\omega}_{110})^2}$$

where $\bar{p}_{11}$ max represents a maximal generated power per unit turbine diameter and unit net head, and $\bar{\omega}_{11}$ represents an arbitrary per unit turbine angular speed per unit net head and unit turbine diameter differeing from the per unit angular speed per unit net head and unit turbine diameter at $\bar{p}_{11}$ max, $\bar{\omega}_{110}$, and corresponds to a per unit power for a unit turbine diameter and unit net head, $\bar{p}_{11}'$.

9. The simulator according to claim 4, further comprising a second simulator circuit for generating a signal representative of the per unit power generated by the turbine per unit turbine diameter and unit net head, said second simulator circuit having an input signal representative of the position of said gate.

10. The simulator according to claims 5 or 9 or 11 further including a circuit for multiplying said signal representative of the per unit generated power by a second coefficient calculated from the first coefficient for producing a signal representative of the effective power generated by the turbine.

11. The simulator according to claim 4, wherein the output of said second circuit is connected to an input of a first of said simulator circuits, said first simulator circuit generating a first value representative of the per unit power generated by the turbine per unit turbine diameter and unit net head in relation to per unit angular speed per unit turbine diameter and unit net head and independently of the gate position and a second of said simulator circuits for generating, responsive to a gate position input signal and independently of the per unit turbine angular speed, a second value representative of the per unit power generated by the turbine per unit turbine diameter and unit net head; and wherein a multiplier circuit multiplies said first value by said second value to generate a third signal representative of the per unit power generated by the turbine per unit turbine diameter and unit net head relative to the angular speed of the turbine.

12. The simulator according to claim 11 further comprising in series:

(a) a circuit for multiplying said third signal by a second coefficient calculated from said first coefficient in order to generate a fourth signal;

(b) a divider circuit for dividing said fourth signal by a signal representative of the per unit angular speed of said turbine in order to generate a torque signal representative of the torque generated by the turbine;

(c) a subtractor circuit for subtracting a loss value from said torque signal and generating a fifth signal;

(d) an integrator circuit for integrating said fifth signal and generating a sixth signal; and (e) an adder circuit for adding a constant to the sixth signal and generating as an output said signal representative of the per unit angular speed of said turbine.

13. The simulator according to claim 12, wherein the loss value is representative of a sum of resistant torques of the turbine expressed in terms of a basic power, in volts-amperes of the turbine driving an electrical generator, divided by the nominal power factor of the generator, and of resistant torques on the turbine when the generator turns over.

14. The simulator according to claim 4, wherein the output signal of said second circuit is connected to a third simulator circuit for generating an output signal representative of the per unit water flow through the turbine per unit net head and unit turbine diameter.

15. The simulator according to claim 14, wherein said third simulator circuit comprises an amplifier, an output of which is connected to a first input of an adder circuit, and a multiplier circuit having first and second inputs, said first input receiving a signal representative of said gate position and said second input being connected to said adder.

16. The simulator according to claim 14 or 15, wherein said third simulator circuit output signal is connected to a circuit for multiplying said third simulator output signal by said first coefficient.

17. The simulator according to claims 2, 9 or 15, wherein said signal representative of the gate position passes first through a limiter circuit.

18. The simulator according to claim 2, further comprising means to simulate a penstock associated with the turbine, and for generating at least one of said working conditions, said penstock simulator means comprising:

(a) an input for receiving a first signal representative of the water flow though the turbine;

(b) a first circuit including means for differentiating said first signal and for multiplying the differentiated first signal by a first constant, thereby producing a first output signal;

(c) a second circuit comprising means for producing a square of said first signal and for subtracting from said squared signal a second constant and for multiplying the resulting signal by a third constant and thereby producing a second output; and (d) an adder having three inputs connected respectively to said first output, said second output and to a fourth constant, said adder being operable for reversing the sum of the signals received at said inputs and generating an output signal representative of a net head of said water flow.

19. A similator for simulating a penstock associated with a turbine, comprising:

(a) an input for receiving a signal representative of water flow through the turbine;

(b) a first circuit including means to differentiate said signal, to multiply the resulting signal by a first constant and thereby produce a first output;

(c) a second circuit comprising means to produce the square of said signal, to subtract from said squared signal a second constant, to multiply the resulting signal by a third constant and thereby produce a second output; and (d) an adder having three inputs connected respectively to said first output, said second output, and to a fourth constant, said adder being operable for reversing the sum of the signals received at said inputs and generating an output signal representative of net head of said water flow.

20. The simulator according to claim 18 or 19, wherein:

(a) said first constant represents a starting time of the water flow;

(b) said second constant is equal to 1;

(c) said third constant represents the relative losses in the penstock; and (d) said fourth constant represents the per unit nominal net head and is equal to $-1$.

21. The simulator according to claim 2, further comprising means to simulate a regulator associated with said turbine and for generating at least one of said working conditions, said regulator simulation means comprising:

(a) an input for receiving a signal representative of the angular speed of the turbine;

(b) a first circuit connected to said input for generating a measured speed signal;

(c) a first subtractor circuit connected to said first circuit for subtracting a reference signal from said measured speed signal;

(d) an adder reverser circuit having a first input connected to said first subtractor circuit;

(e) a second circuit connected to said adder reverser circuit for generating a pilot valve signal;

(f) a first simulator circuit connected to said second circuit, for receiving said pilot valve signal;

(g) an integrator connected to said first simulator circuit for generating an output signal representative of a position; and (h) a second simulator circuit for simulating static characteristics connected to a second input of said adder reverser circuit.

22. The simulator according to claim 21 or 19, wherein said signal representative of a position is a position of a water gate.

23. A simulator for simulating a regulator associated with a turbine, comprising:

(a) an input for receiving a signal representative of the angular speed of the turbine;

(b) a first circuit connected to said input for generating a measured speed signal;

(c) a first subtractor circuit for subtracting a reference signal from said measured speed signal;

(d) an adder reverser circuit having a first input connected to said first subtractor circuit;

(e) a second circuit connected to said adder reverser circuit for generaing a pilot valve signal;

(f) a first simulator circuit connected to said second circuit;

(g) an integrator connected to said first simulator circuit for generating an output signal representative of a position; and (h) a second simulator circuit for simulating static characteristics connected to a second input of said adder reverser circuit.

24. The simulator according to claim 21 or 23, wherein a threshold suppressor circuit is switchably connected between said first subtractor circuit and said adder reverser circuit.

25. The simulator according to claim 24, wherein said threshold suppressor circuit has a unitary gain when the absolute value of the input signal is larger than a minimal value and otherwise has a gain equal to zero.

26. The simulator according to claim 24, including a switch for switching said threshold suppressor out of the regulator simulation means.

27. The simulator according to claim 21 or 23, further comprising a third circuit for generating an acceleration signal between said first subtractor circuit and a third input of said adder reverser circuit.

28. The simulator according to claim 27, including a switch for switching said third circuit out of the regulator simulation means.

29. A simulator according to claim 27, wherein said third circuit has a transfer function $$\frac{\bar{R}P}{\left(1 + \frac{\bar{R}}{A}P\right)}$$

where $\bar{R}$ represents a per unit gain and $(\bar{R}/A)$ represents a time constant and where A is a constant and P is a differential operator.

30. The simulator according to claim 27, further comprising means for annulling a gain of said fourth circuit.

31. The simulator according to claim 21 or 23, wherein said first simulator circuit has a unitary gain when the pilot valve signal is lower in absolute value than a first value, and has a constant gain greater than 1 when the pilot valve signal has an absolute value between the first and a second value, and otherwise generates a constant output.

32. The simulator according to claim 21 or 23, further comprising:

a fourth circuit for generating a dashpot signal and connected to receive said position signal; and a third simulator circuit having an input connected to said fourth circuit and an output connected to a third input of said adder reverser circuit, said third simulator circuit having a unitary gain when the dashpot signal is lower in absolute value than a minimal value and otherwise having a gain lower than 1.

33. The simulator according to claim 32, wherein said fourth circuit has a transfer function equal to $$\frac{\delta\tau_r P}{(1 + \tau_r P)}$$

where $\delta$ and $\tau_r$ are constants representative of a transient output and a relaxation time, respectively, and P is a differential operator.

34. The simulator according to claim 21 or 23, further comprising a second subtractor circuit connected to an output of the integrator in order to subtract from said position signal, a reference value, said second subtractor circuit having an output adapted to be connected to said second simulator circuit.

35. The simulator according to claim 21 or 23, further comprising in series:

(a) a fifth circuit for generating a measure signal and having as input a signal representative of the instantaneous generated power produced by the simulator;

(b) a third subtractor circuit for subtracting from said measure signal a reference value; and (c) a sixth circuit for receiving the output of said third subtractor circuit and having an output connected to said second simulator circuit.

36. A simulator according to claim 35, wherein said fifth circuit has a transfer function equal to $$\frac{1}{\cos\phi(1 + \tau_w P)}$$

wherein $\cos\phi$ is a power factor of a generator and $\tau_w$ is a time constant and P is a differential operator.

37. The simulator according to claim 35, further comprising a second subtractor circuit connected to an output of the integrator in order to subtract from said position representative signal said reference value, and a switch for selectively inputting to said second simulator circuit either the output of the sixth circuit or an output of said second subtractor circuit.

38. The simulator according to claim 35, further comprising means to annul said reference value.

* * * * *